United States Patent
Allemand et al.

(10) Patent No.: US 9,065,104 B2
(45) Date of Patent: Jun. 23, 2015

(54) PROCESS FOR MANUFACTURING ELEMENTARY ELECTROCHEMICAL CELLS FOR ENERGY- OR HYDROGEN-PRODUCING ELECTROCHEMICAL SYSTEMS, IN PARTICULAR OF SOFC AND HTE TYPE

(75) Inventors: Alexandre Allemand, Bordeaux (FR); Sophie Beaudet Savignat, Ballan Mire (FR); Eric Bruneton, Fondettes (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 441 days.

(21) Appl. No.: 13/703,516

(22) PCT Filed: Jun. 10, 2011

(86) PCT No.: PCT/EP2011/059660
§ 371 (c)(1),
(2), (4) Date: Dec. 11, 2012

(87) PCT Pub. No.: WO2011/154516
PCT Pub. Date: Dec. 15, 2011

(65) Prior Publication Data
US 2013/0082421 A1    Apr. 4, 2013

(30) Foreign Application Priority Data
Jun. 11, 2010 (FR) ..................................... 10 54642

(51) Int. Cl.
*H05B 6/00* (2006.01)
*B29C 67/00* (2006.01)
(Continued)

(52) U.S. Cl.
CPC ................ *H01M 8/1016* (2013.01); *C25B 1/02* (2013.01); *C25B 9/00* (2013.01); *H01M 4/8621* (2013.01);
(Continued)

(58) Field of Classification Search
CPC ............ H01M 4/8621; H01M 4/8663; H01M 4/8889; H01M 8/0206; H01M 8/0213; H01M 8/0215; H01M 8/1016; H01M 8/1213; H01M 10/3918; C25B 1/02; C25B 9/00; Y02E 60/521; Y02E 60/525; B29K 2105/251; B29C 43/006; B29C 43/18; B29C 43/203; C04B 33/32; C04B 33/323; C04B 33/326; C04B 35/111; C04B 35/593; C04B 35/64; C04B 35/645; C04B 37/001; C04B 2235/666; C04B 2235/77; C01P 2006/10
USPC .......... 264/434, 614, 618, 112, 113, 123, 125
See application file for complete search history.

(56) References Cited

U.S. PATENT DOCUMENTS 3,241,956 A    3/1966   Inoue
3,250,892 A    5/1966   Inoue
(Continued)

FOREIGN PATENT DOCUMENTS

CN    102167623 A    8/2011
EP    2166601 A1    3/2010
(Continued)

OTHER PUBLICATIONS

Dahl, P., et al., "Densification and properties of zirconia prepared by three different sintering techniques", Ceramics International, Sep. 12, 2006, pp. 1603-1610, vol. 33.
(Continued)

*Primary Examiner* — Sing P Chan
(74) *Attorney, Agent, or Firm* — Hultquist, PLLC; Mary B. Grant

(57) ABSTRACT

The invention relates to a process for manufacturing at least one elementary electrochemical cell comprising a first and a second electrode between which an electrolyte is intercalated, said first and second electrodes and said electrolyte being in the form of layers, which process is characterized in that it comprises: a) producing at least one structure comprising a layer of a powder of a first electrode material and a layer of a powder of a second electrode material between which a layer of a powder of an electrolyte material is intercalated; and b) simultaneously sintering all the powder layers by an electric field sintering. Applications: manufacture of energy- or hydrogen-producing electrochemical systems, in particular solid oxide fuel cells (SOFCs) or high temperature electrolysers cells (HTEs).

23 Claims, 4 Drawing Sheets

(51) Int. Cl.
  *B29C 67/24* (2006.01)
  *C04B 33/32* (2006.01)
  *C04B 35/64* (2006.01)
  *H01M 8/10* (2006.01)
  *C25B 1/02* (2006.01)
  *C25B 9/00* (2006.01)
  *H01M 4/86* (2006.01)
  *H01M 4/88* (2006.01)
  *H01M 8/12* (2006.01)
  *H01M 8/02* (2006.01)

(52) U.S. Cl.
  CPC .......... *H01M 4/8663* (2013.01); *H01M 4/8889* (2013.01); *H01M 8/0206* (2013.01); *H01M 8/0213* (2013.01); *H01M 8/0215* (2013.01); *H01M 8/1213* (2013.01); *Y02E 60/521* (2013.01); *Y02E 60/525* (2013.01)

(56) References Cited

U.S. PATENT DOCUMENTS

| | | | |
|---|---|---|---|
| 3,446,607 A | 5/1969 | Volk et al. | |
| 3,503,118 A | 3/1970 | Criscione et al. | |
| 3,775,137 A | 11/1973 | Clougherty et al. | |
| 4,029,566 A * | 6/1977 | Brandmair et al. | 204/290.08 |
| 4,076,899 A * | 2/1978 | Kring | 429/432 |
| 4,078,988 A * | 3/1978 | Brandmair et al. | 204/287 |
| 4,264,425 A * | 4/1981 | Kimura et al. | 204/412 |
| 4,369,212 A * | 1/1983 | Rogers et al. | 427/352 |
| 4,668,583 A | 5/1987 | Olander | |
| 5,283,109 A | 2/1994 | Kaplan et al. | |
| 5,614,162 A | 3/1997 | Gribkov et al. | |
| 5,725,955 A | 3/1998 | Tawil et al. | |
| 5,750,450 A | 5/1998 | Bull et al. | |
| 5,922,486 A | 7/1999 | Chiao | |
| 6,582,779 B2 | 6/2003 | Li et al. | |
| 6,875,374 B1 * | 4/2005 | Zhan et al. | 252/502 |
| 6,976,532 B2 * | 12/2005 | Zhan et al. | 165/185 |
| 7,128,850 B2 * | 10/2006 | Duan et al. | 252/518.1 |
| 7,736,787 B2 * | 6/2010 | Day et al. | 429/460 |
| 7,790,332 B2 * | 9/2010 | Ecer | 429/535 |
| 8,007,859 B2 * | 8/2011 | Ryu et al. | 427/115 |
| 8,343,684 B2 * | 1/2013 | Devoe et al. | 429/481 |
| 8,546,041 B2 * | 10/2013 | Omersa | 429/469 |
| 8,940,220 B2 * | 1/2015 | Raj et al. | 264/434 |
| 8,962,209 B2 * | 2/2015 | Devoe et al. | 429/446 |
| 2002/0081396 A1 | 6/2002 | Li et al. | |
| 2004/0238795 A1 * | 12/2004 | Duan et al. | 252/500 |
| 2004/0261978 A1 * | 12/2004 | Zhan et al. | 165/104.11 |
| 2005/0067607 A1 * | 3/2005 | Zhan et al. | 252/502 |
| 2007/0054169 A1 * | 3/2007 | Day et al. | 429/30 |
| 2008/0003481 A1 * | 1/2008 | Ecer | 429/33 |
| 2008/0090071 A1 | 4/2008 | Valle et al. | |
| 2008/0160181 A1 * | 7/2008 | Ryu et al. | 427/115 |
| 2008/0261099 A1 * | 10/2008 | Nguyen et al. | 429/33 |
| 2009/0068373 A1 * | 3/2009 | Lee et al. | 427/453 |
| 2009/0226781 A1 * | 9/2009 | Devoe et al. | 429/20 |
| 2009/0280376 A1 * | 11/2009 | Chiba et al. | 429/30 |
| 2010/0086822 A1 * | 4/2010 | Omersa | 429/30 |
| 2010/0139840 A1 | 6/2010 | Allemand et al. | |
| 2013/0082421 A1 | 4/2013 | Allemand et al. | |
| 2013/0085055 A1 * | 4/2013 | Raj et al. | 501/1 |
| 2013/0130149 A1 * | 5/2013 | Devoe et al. | 429/481 |
| 2013/0224621 A1 * | 8/2013 | Kawase | 429/478 |
| 2014/0004271 A1 | 1/2014 | Allemand et al. | |
| 2014/0272114 A1 * | 9/2014 | Oriakhi et al. | 427/115 |
| 2014/0306381 A1 * | 10/2014 | Raj et al. | 264/414 |
| 2014/0322564 A1 * | 10/2014 | Huang et al. | 429/50 |

FOREIGN PATENT DOCUMENTS

| | | | | |
|---|---|---|---|---|
| FR | 1475529 | A | 3/1967 | |
| FR | 2716208 | A1 | 8/1995 | |
| FR | 2932496 | A1 | 12/2009 | |
| JP | 6135721 | A | 5/1994 | |
| JP | 2000-277127 | A | 10/2000 | |
| WO | 9313033 | A1 | 7/1993 | |
| WO | WO 0069008 | A1 * | 11/2000 | H01M 4/88 |
| WO | 2004083147 | A1 | 9/2004 | |
| WO | 2009099447 | A1 | 8/2009 | |

OTHER PUBLICATIONS

Liu, B., et al., "La0.9Sr0.1Ga0.8Mg0.2O3-delta sintered by spark plasma sintering (SPS) for intermediate temperature SOFC electrolyte", "Journal of Alloys and Compounds", Mar. 31, 2007, pp. 383-389, vol. 458.

Munir, Z., et al, "The effect of electric field and pressure on the synthesis and consolidation of materials: a review of the spark plasma sintering method", "J. Mater. Sci.", Feb. 1, 2006, pp. 763-777, vol. 41.

Han, K., et al., "Rate of Oxidation of Carbon Fiber/Carbon Matrix Composites with Antioxidation Treatment at High Temperature", "J. Electrochem. Soc.: Sold-State Science and Technology", Apr. 1987, pp. 1003-1009, vol. 134, No. 4.

Li, J., et al., "Thompson Scientific", Jan. 1, 2011, pp. AN 2011-M14927, vol. Database WPI, No. XP-002679688.

McKee, D., "Oxidation Behavior and Protection of Carbon/Carbon Composites", "Carbon", 1987, pp. 551-557, vol. 25, No. 4.

McKee, D., "Chapter 3: Oxidation Protection of Carbon Materials", "Chemistry and Physics of Carbon (Ed.: Thrower, P.)", May 23, 1991, pp. 173231, vol. 23, Publisher: CRC Press.

Note: For the non-patent literature citations that no month of publication is indicated, the year of publication is more than 1 year prior to the effective filing date of the present application.

* cited by examiner

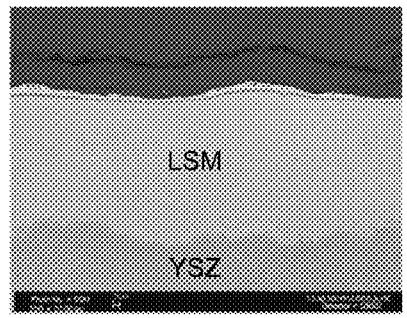
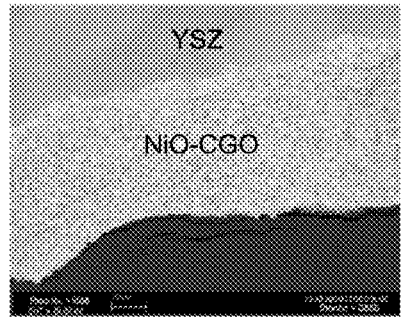
FIG. 4A　　　　　　FIG. 4B
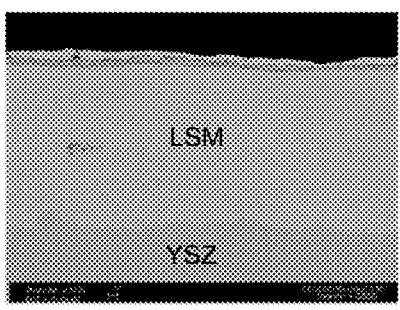
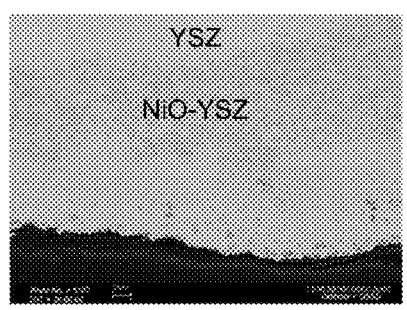
FIG. 5A　　　　　　FIG. 5B

PROCESS FOR MANUFACTURING ELEMENTARY ELECTROCHEMICAL CELLS FOR ENERGY- OR HYDROGEN-PRODUCING ELECTROCHEMICAL SYSTEMS, IN PARTICULAR OF SOFC AND HTE TYPE

CROSS-REFERENCE TO RELATED APPLICATIONS

This application is a U.S. national phase under the provisions of 35 U.S.C. §371 of International Patent Application No. PCT/EP11/59660 filed Jun. 10, 2011, which in turn claims priority of French Patent Application No. 1054642 filed Jun. 11, 2010. The disclosures of such international patent application and French priority patent application are hereby incorporated herein by reference in their respective entireties, for all purposes.

TECHNICAL FIELD

The present invention relates to the field of energy- or hydrogen-producing electrochemical systems and in particular to the field of solid oxide fuel cells, more simply called SOFCs, and high temperature electrolysers, more simply called HTEs.

It more specifically pertains to a process allowing the manufacture of elementary electrochemical cells, able to be used as components of energy- or hydrogen-producing electrochemical systems, SOFCs and HTEs in particular.

STATE OF THE PRIOR ART

SOFCs are electrochemical systems producing electric and heat energy which use the chemical energy generated by the water-forming reaction between hydrogen and oxygen.

As can be seen in appended FIG. 1, the operating principle of an elementary cell (or active core) 5 of an SOFC is based on the following mechanism: oxygen from air which is supplied to the cathode 1 is separated to give $O^{2-}$ anions. The anions thus formed migrate across the electrolyte 2 as far as the anode 3 at which they oxidize the hydrogen atoms which are supplied by the fuel. This reaction releases electrons and water.

HTEs are electrochemical systems which produce hydrogen whose operating principle is exactly the opposite of SOFCs.

Indeed, as can be seen in appended FIG. 2, for an elementary cell 5' of a HTE, steam is supplied to the cathode 1' and the water molecules are separated into hydrogen and $O^{2-}$ anions. The anions thus formed diffuse across the electrolyte 2' to recombine in the form of oxygen at the anode 3' whilst the hydrogen, together with the steam, remains at the cathode. This hydrogen can then be recovered and used as fuel in other applications.

At the current time, in SOFCs and HTEs the electrodes are formed of ceramics or porous cermets having electronic conduction or mixed electronic/ionic conduction, while the electrolyte is formed of a dense ceramic having pure ionic conduction, which is typically yttria-doped zirconia.

Therefore, one of the specificities of SOFCs and HTEs lies in their high operating temperatures which lie in the range of 700° C. to 900° C. and which are required for obtaining satisfactory ionic conductivity of the ceramic electrolyte.

SOFCs allow the use of a wide variety of fuels including numerous hydrocarbons which are able to form hydrogen, this being formed either directly within the anode, in which case the term "direct reforming" is used, or outside the active core via an external reformer in which case the term "indirect reforming" is used.

SOFCs, among all known electric producing systems, are those which have the highest yields for minimum polluting and greenhouse emissions.

These performance levels make their use particularly attractive for the stationary supply of energy in power ranges of one kilowatt to one hundred megawatts. However the use of SOFCs in the field of Auxiliary Power Units (APUs) in the automotive sector, for industrial vehicles and avionics for example, has also been the subject of research.

It happens that, in spite of their advantages, SOFCs are not yet marketed in particular on account of their manufacturing and operating costs which lead to a prohibitive cost price per electric kilowatt produced.

With respect to HTEs, the fuel used in chiefly steam to which is added small amount of hydrogen so as to limit as much as possible the oxidation of the metal present in the constituent cermet of the anode.

The advantages of HTEs in terms of production yield and low impact on the environment are similar to those of SOFCs, but their commercial development also comes up against a certain number of problems including problems relating to manufacturing and operating costs.

Different strategies can be adopted to reduce the manufacturing and operating costs of SOFCs and HTEs, such as the use of electrode and electrolyte materials that are less costly than those used up until now, the use of electrolyte materials allowing the operation of SOFCs and HTEs at lower temperatures than those currently used, the development of processes allowing the low-cost mass production of these electrochemical systems.

To date, two main geometries have been proposed for SOFCs and HTEs. The first provides for the arranging of the electrodes and electrolyte of an elementary cell in stacked layers around a porous tube and is therefore called tubular, whilst the second provides for arranging these elements in the form of a stack of planer layers and is therefore called planar.

These geometries have recourse to different manufacturing methods but which have in common the use, for the manufacture of one same elementary cell, of several types of techniques such as extrusion, hot isostatic pressing, plasma spraying, liquid phase deposit (from slurries) of screen printing type, dip coating or air spraying, vapour phase deposit of spray pyrolysis type, tape casting, slip casting or electrophoresis, and the recourse to a minimum of two and even three sintering operations at high temperatures generally higher than 1000° C., per elementary cell.

Yet in addition to the fact that these processes are complex to carry out, the sintering operations they require are particularly time-consuming (at least one day must be considered for each sintering operation), energy-consuming (having regard to the temperatures used) and equipment-heavy and on this account largely contribute towards weighing down the manufacturing costs of SOFCs and HTEs.

The Inventors therefore have therefore set themselves the objective of providing a process which in general allows the manufacturing of elementary electrochemical cells able to be a constituent part of electrochemical systems of SOFC and HTE type, in a manner that is much simpler, quicker and less costly than the processes proposed up until now for the manufacture of such cells.

DESCRIPTION OF THE INVENTION

This objective and others are achieved with the invention which proposes a process for manufacturing at least one elementary electrochemical cell comprising a first and second electrode between which an electrolyte is intercalated, said first and second electrodes and said electrolyte being in layered form, which process comprising:

a) producing at least one structure comprising a layer of a powder of a first electrode material and a layer of a powder of a second electrode material between which a layer of a powder of an electrolyte material is intercalated; and b) simultaneously sintering all the powder layers using an electric field sintering.

Therefore, according to the invention, the materials intended to form the electrodes and electrolyte of an elementary electrochemical cell are used in powder form which are arranged so as to form a triple layer of powders in which the powder of electrolyte material is intercalated between the powders of the electrode materials, the sintering of all these powders then being conducted in a single step via an electric field sintering.

In the foregoing and in the remainder hereof, by—electric field sintering—is meant sintering in which the material(s) to be densified is(are) subjected to an uniaxial pressure in a matrix—in exactly the same manner as in an uniaxial load sintering—but in which the matrix, which is formed of an electrically conductive material, typically graphite, has an electric current of strong intensity passed through it.

As a result, the electric field sintering allows densifying in very short times highly refractory materials such as ceramics and ceramic-metal composites.

In the invention, it is preferred that the sintering should be conducted using the technique known as SPS (Spark Plasma Sintering), FAST (Field Activated Sintering Technique) and PECS (Pulsed Electric Current Sintering) and in which the electric field used is a pulsed field.

However, it is also possible to conduct the sintering using a sintering technique in which the electric field which is applied to the matrix is other than a pulsed field, e.g. an alternating field.

For the invention, the first and second electrode materials are preferably chosen from the ceramics having electronic conduction and, better still, having mixed electronic/ionic conduction, whilst the electrolyte material is preferably chosen from ceramics having an exclusively ionic conduction.

These materials may therefore be:

for the electrode intended to act as a positive electrode in the elementary electrochemical cell: a lanthanum-based oxide of perovskite structure such as a lanthanum manganite of formula $La_{1-x}A_xMnO_3$ in which A represents strontium, calcium or iron, e.g. $La_{1-x}Sr_xMnO_3$ (where x is typically between 0.2 and 0.3, denoted LSM, a lanthanum ferrite of formula $La_{1-x}Sr_xFeO_3$, e.g. $La_{0.8}Sr_{0.2}FeO_3$, denoted LSF, a lanthanum cobaltite of formula $La_{1-x}A_xCoO_3$ in which A represents strontium or barium, e.g. $La_{0.6}Sr_{0.4}CoO_3$, denoted LSCO, or a cobalto-manganite of formula $LaMn_{1-x}Co_xO_3$; or else a nickelate or cuprate of formula $A_2MO_{4+\delta}$ in which A represents lanthanum, praseodymium or neodymium whilst M represents nickel or copper; or else $La_{1-x}Sr_xFe_{1-y}Co_yO_3$, denoted LSCF.

for the electrode intended to act as a negative electrode in the elementary electrochemical cell: a metal/oxide cermet such as a cermet of nickel and yttria-doped zirconia denoted NiO-YSZ, a cermet of nickel and gadolinium-doped ceria, denoted NiO-CGO, a cermet of nickel and samarium-doped ceria, denoted NiO-SDC, a cermet of copper and yttria-doped zirconia or a cermet of copper and yttria-doped ceria; or else a ceria-based composite such as CGO-YSZ-Cu; a titanate such as $La_4Sr_{n-4}Ti_nO_{3n+2}$; or a lanthanum chromite such as $La_{1-x}Sr_xCr_{1-y}Mn_yO_3$, denoted LSCM, or $La_{1-x-y}Ce_xSr_yCr_{1-x}Mn_zO_3$; and for the electrolyte, for example for a SOFC or HTE: a mixture of oxides of $MO_2$–$M'O_3$ type where M represents zirconium or cerium whilst M' represents yttrium or scandium or an element of the lanthanide group such as yttria-doped zirconia denoted YSZ ($ZrO_2$+4-10 mole % of $Y_2O_3$); a ceria of formula $Ce_{1-x}M_xO_{2-\delta}$ in which M represents samarium, gadolinium or yttrium such as gadolinium-doped ceria $Ce_{0.8}Gd_{0.2}O_{1.9}$, denoted CGO; a $LaGaO_3$-based oxide of perovskite structure in which the lanthanum can be partly substituted by strontium, calcium or barium whilst the gallium can be partly substituted by magnesium and/or cobalt or iron such as lanthanum gallate for example $La_{0.9}Sr_{0.1}Ga_{0.8}Mg_{0.2}O_{3-\delta}$, denoted LSGM; or an apatite of formula $La_{10-x}A_x(Si_{1-y}B_yO_4)_6O_{2\pm\delta}$ in which A represents strontium, calcium, barium, etc, whilst B represents aluminium, germanium, magnesium, etc.

Among the aforementioned materials, particular preference is given to LSM for the electrode intended to act as a positive electrode in the elementary electrochemical cell, to NiO-YSZ or NiO-CGO for the electrode intended to act as a negative electrode in the elementary electrochemical cell, and YSZ for the electrolyte.

Insofar as it is desirable that after sintering, the electrodes should have a certain porosity whilst the electrolyte on the contrary should be as dense as possible, the powders of the first and second electrode materials used at step a) may advantageously contain one or more thermally decomposable pore-forming agents, for example of potato flour type, or of corn, rice or wheat starch type, which, on losing their structural integrity at step b), will allow the extent of porosity of the electrodes to be adjusted in relation to the conditions (temperature, pressure, duration, etc.) under which step b) is performed.

According to the invention, the structure produced at step a) may additionally comprise two layers of an interconnect material which is distributed either side of the layers of powders of the first and second electrode materials. This interconnect material, which may in particular be a metal alloy such as an iron and chromium alloy or nickel and chromium alloy, or a ceramic such as a lanthanum chromite, may be in the form of a powder and can be densified at step b) jointly with the first and second electrode materials and the electrolyte material.

This leads to obtaining, after step b), what is conventionally called a SRU (Single Repeat Unit), i.e. a unit which comprises an elementary electrochemical cell sandwiched between two interconnect elements made integral with this cell, which reduces the number of operations required to assemble the elementary electrochemical cell with interconnect elements, and even reduces the interconnect fabrication operations.

The process of the invention can be used to fabricate only one elementary electrochemical cell or only one SRU at single time.

However, this being one of the major advantages of this process, advantage can also be taken thereof to fabricate simultaneously several elementary electrochemical cells or several SRUs, in which case step a) preferably comprises the producing of a plurality of structures such as previously defined which are stacked on one another whilst being separated by a separating element whose type is chosen in relation to the end product.

Therefore, for example, if it is desired to fabricate simultaneously a plurality of elementary electrochemical cells or SRUs which are intended to be used independently of each other after the fabrication thereof, then the separating element is preferably a layer of a material which allows the separation of these cells or SRUs after step b), such as a sheet of graphite for example, whose two sides are advantageously coated with a carbon-diffusion barrier to prevent carbon at step b) from diffusing into the elementary electrochemical cells or SRUs from the graphite sheet.

Sheets of graphite which may be used are, for example, the flexible graphite sheets which are marketed by Carbone Lorraine under the reference Papyex™ and which are conventionally used to line the matrices used in the electrical field sintering techniques, whilst the carbon diffusion barrier may be boron nitride for example.

On the other hand, if it is desired to fabricate simultaneously a plurality of SRUs which are intended to be used in one same electrochemical system after they have been fabricated, then the separating element is preferably a layer of an interconnect material such as previously defined, which here again allows savings on the number of operations required for connecting the SRUs to each other, and even for fabricating interconnect elements intended to be used as components of these SRUs.

At all events, step b) remains unchanged.

According to the invention, it is preferred that the thicknesses of the electrodes and electrolyte of the, or of each, elementary electrochemical cell should be the following:

if the mechanical support for the elementary electrochemical cell(s) is intended to be ensured by one of the electrodes: from 300 µm to 1 mm for the supporting electrode, from 5 to 50 µm for the electrolyte and from 20 to 100 µm and, better still from 40 to 60 µm, for the other electrode; and if the mechanical support for the elementary electrochemical cell(s) is intended to be ensured by the electrolyte: from 100 to 300 µm for the supporting electrolyte and from 20 to 100 µm and, better still from 40 to 60 µm, for each of the electrodes.

The thicknesses of the powder layers which form the structure at step a) are therefore preferably chosen so as to obtain such thicknesses giving consideration to a possible tendency of these powder layers to shrink during the sintering at step b).

In the invention, the elementary electrochemical cell(s) preferably have a planar geometry, this geometry generally leading to better performing electrochemical systems, notably in terms of power output, than a tubular geometry.

However, the process of the invention can evidently be applied to the fabrication of elementary electrochemical cells having a tubular geometry.

Also, the elementary electrochemical cell(s) are preferably cells of electrochemical systems producing energy or hydrogen, and in particular of SOFCs or HTEs.

In addition to the advantages already mentioned, the process of the invention has the advantage of offering the possibility of fabricating electrochemical cells covering a wide size range, with a surface area possibly ranging from a few square millimeters to more than one hundred square centimeters, for example 150 $cm^2$, and wide composition range.

In addition, since it leads to obtaining elementary electrochemical cells in which the electrodes and electrolytes have finer grain microstructures than those of electrodes and electrolytes obtained with prior art processes—which should in particular result in an improved ionic conductivity and improved mechanical properties of the electrolytes allowing a reduction in the thickness of these electrolytes—the process of the invention also allows envisaging significant increase in the performance levels of the electrochemical systems manufactured from these cells. The reduction in grain size is a consequence of the very short sintering time (of the order of a few minutes to obtain a dense material) compared with other fabrication processes frequently found in the literature.

Other characteristics and advantages of the invention will become apparent from the remainder of the description which relates to an example of embodiment of the process of the invention to manufacture elementary electrochemical cells able to be used as constituent elements of SOFCs or HTEs, and which refers to the appended Figures.

Evidently the remainder of the description is only given to illustrate the subject of the invention and does not in any way limit this subject.

BRIEF DESCRIPTION OF THE FIGURES

FIGS. 4A and 4B are photographs taken under scanning electron microscopy of polished cross-sections of an elementary electrochemical cell manufactured using the process of the invention, of composition LSM/YSZ/NiO-CGO, which respectively show the junction between the LSM and YSZ layers (FIG. 4A) and the junction between the YSZ and NiO-CGO layers (FIG. 4B).

FIGS. 5A and 5B are photographs taken under scanning electron microscopy of polished cross-sections of an elementary electrochemical cell manufactured following the process of the invention, of composition LSM/YSZ/NiO-YSZ, which respectively show the junction between the LSM and YSZ layers (FIG. 5A) and the junction between the YSZ and NiO-YSZ layers (FIG. 5B).

DETAILED DESCRIPTION OF ONE PARTICULAR EMBODIMENT

A series of planar elementary electrochemicals cell was produced using the process of the invention.

These cells measure 8 mm in diameter and are each formed of a stack successively comprising:

a layer of LSM, about 50 µm thick, as a first electrode material;

a layer of YSZ, about 150 µm thick, as an electrolyte material; and a layer of NiO-YSZ or NiO-CGO, about 50 µm thick, as a second electrode material.

Each cell was obtained by depositing in a graphite pelletizer of inner diameter 8 mm, previously lined with a graphite sheet (Papyex™) coated with boron nitride: a layer of LSM powder (corresponding to 0.0097 g of powder for a porosity of 40% after sintering), then a layer of YSZ powder (corresponding to 0.0433 g of powder for a porosity of 40% after sintering) and finally a layer of NiO-YSZ powder (corresponding to 0.0099 g of powder for a porosity of 40% after sintering) or NiO-CGO (corresponding to 0.0104 g of powder for a porosity of 40% after sintering), and by then subjecting the structure thus formed to pulsed electric field sintering using a SPS apparatus of Sumitomo trademark, Dr Sinter 2080 model.

This sintering was conducted under the following conditions:

electric field: use of pulse sequences of 8 pulses lasting 3.3 ms, separated from each other by 2 periods of 3.3 ms without any current;

temperature: temperature rise from 300 to 600° C. in 3 minutes, then temperature rise from 600 to 1200° C. in 14 minutes, then holding the temperature at 1200° C. for 5 minutes, followed by slow cooling due to the thermal inertia of the system;

pressure: rise in pressure from 0 to 25 MPa in 3 minutes, then pressure hold at 25 MPa for 19 minutes, before pressure release.

After the sintering step, the elementary electrochemical cells thus obtained were subjected to microscope examinations and to elementary analysis by energy dispersive X-ray spectrometry (EDS).

Figure 1:
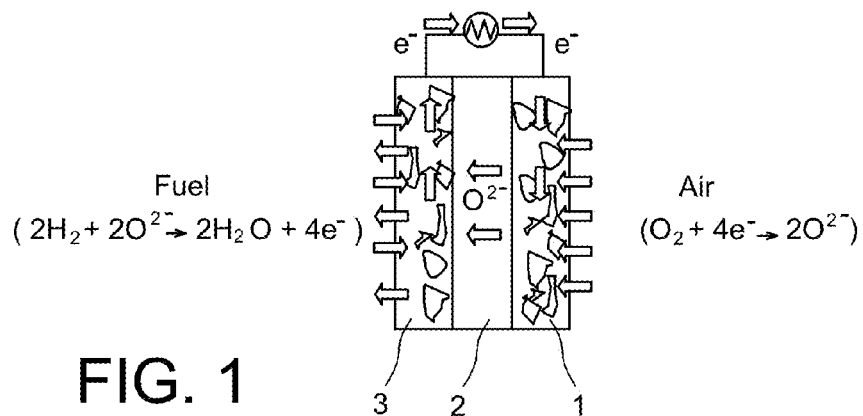
FIG. 1, already described, is a schematic illustration of the operating principle of a SOFC elementary cell.
Figure 2:
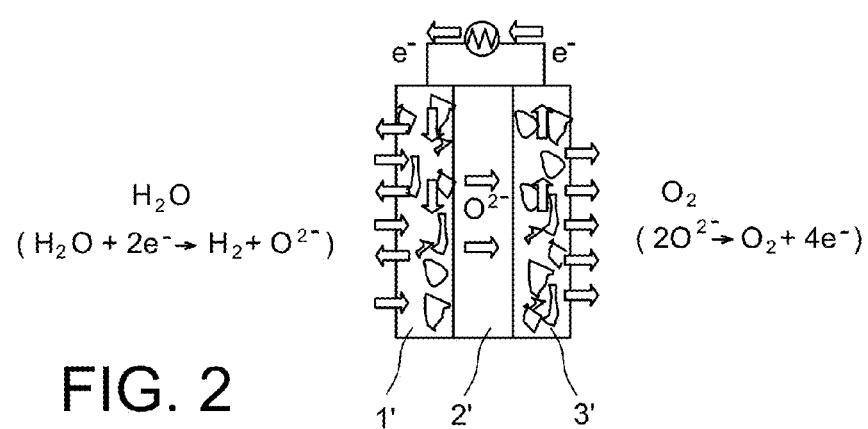
FIG. 2, already described, is a schematic illustration of the operating principle of a HTE elementary cell.
Figure 3:
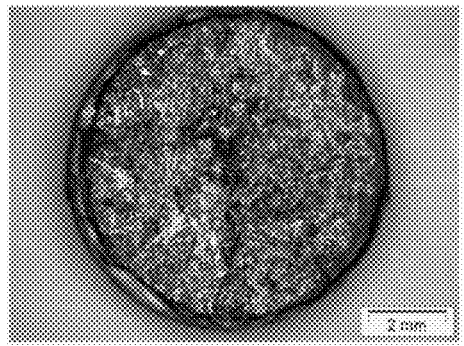
FIG. 3 is a photograph of an elementary electrochemical cell manufactured using the process of the invention, which shows an overhead view of this cell.

As shown in FIG. 3 which is a photograph of an elementary electrochemical cell from an overhead view, this cell is fully integrated from a mechanical viewpoint.

Also, as shown in FIGS. 4A, 4B, 5A and 5B, which correspond to SEM photographs of polished cross-sections of two cells, one of composition LSM/YSZ/NiO-CGO (FIGS. 4A and 4B) and the other of composition LSM/YSZ/NiO-YSZ (FIGS. 5A and 5B), the elementary electrochemical cell obtained with the process of the invention exhibit a good density and are formed of a compact stack of layers which have well adhered to each other under the effect of sintering.

Indeed, practically no adherence defect is observed and the interfaces between the layers are clean-cut without any delamination. The interfaces are irregular. However, this point is not critical for the proper functioning of an elementary electrochemical cell.

Figure 6A:
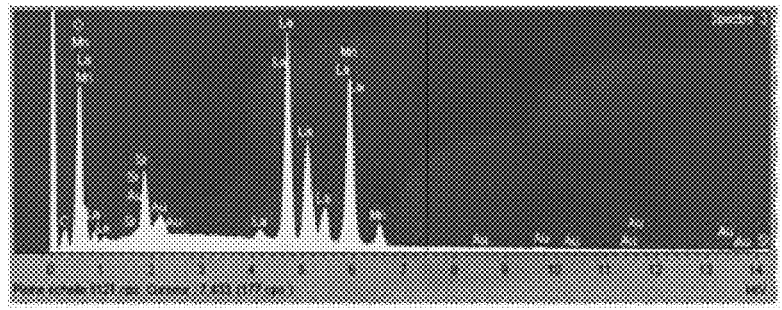
FIGS. 6A, 6B and 6C are the spectra obtained using energy dispersive X-ray spectrometry for the LSM (FIG. 6A), YSZ (FIG. 6B) and NiO-CGO (FIG. 6C) layers of the elementary electrochemical cell whose cross-sections are illustrated in FIGS. 4A and 4B.
Figure 6B:
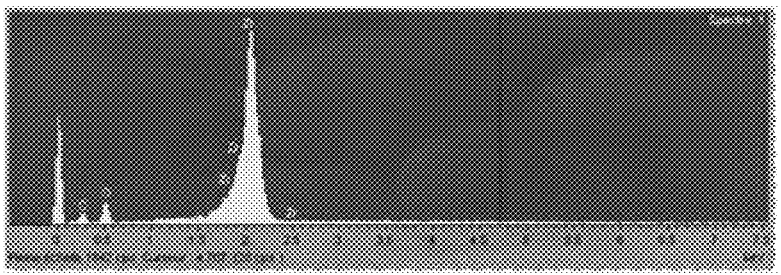
Figure 6C:
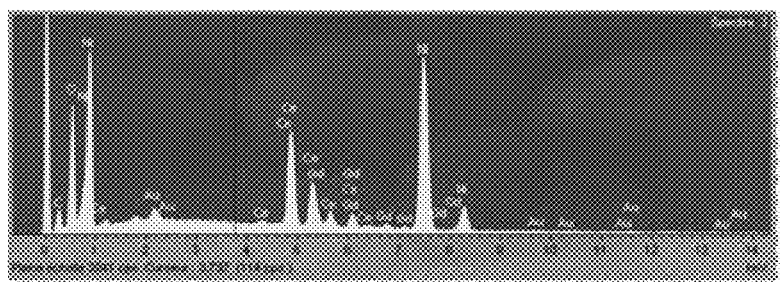
Figure 7A:
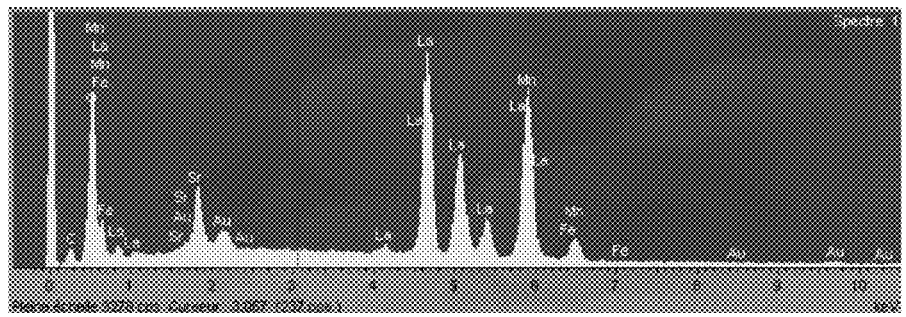
FIGS. 7A, 7B and 7C are the spectra obtained using energy dispersive X-ray spectrometry for the LSM (FIG. 7A), YSZ (FIG. 7B) and NiO-YSZ (FIG. 7C) layers of the elementary electrochemical cell whose cross-sections are illustrated in FIGS. 5A and 5B.
Figure 7B:
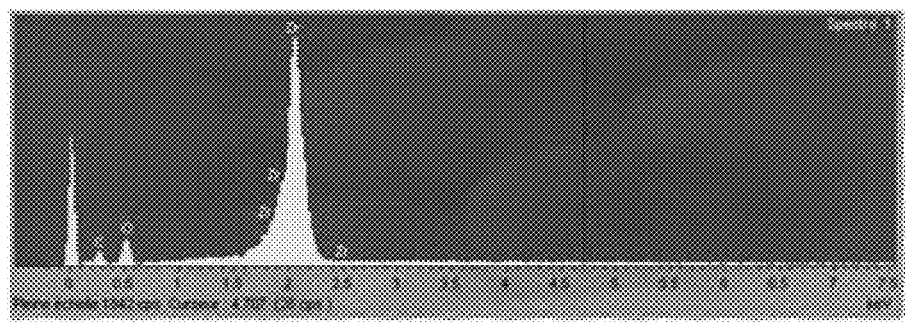
Figure 7C:
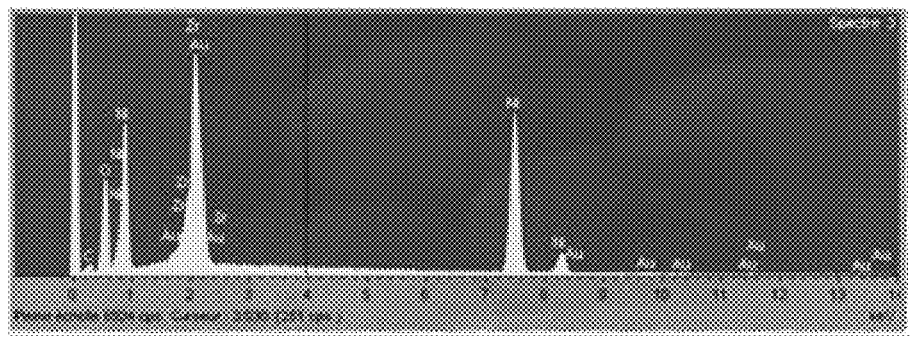

Finally, as shown in FIGS. 6A to 6C, and in FIGS. 7A to 7C, the layers formed indeed have the expected composition.

Therefore the EDS spectra shown in FIGS. 6A and 6B indicate a composition conforming to the desired composition for a LSM layer; those illustrated in FIGS. 7A and 7B indicate a composition conforming to the desired composition for a YSZ layer; the spectrum given in FIG. 6C indicates a composition conforming to the desired composition for a NiO-CGO layer whilst the spectrum shown in FIG. 7C indicates a composition conforming to the desired composition for a NiO-YSZ layer.

The invention claimed is:

1. A process for manufacturing an elementary electrochemical cell, the cell comprising a first and a second electrode and an electrolyte which is intercalated between the first and second electrodes, the first and second electrodes and the electrolyte being in a form of layers, comprising:
   a) producing a structure comprising a layer of a powder of a first electrode material, a layer of a powder of a second electrode material and a layer of a powder of an electrolyte material which is intercalated between the layer of the powder of the first electrode material and the layer of the powder of the second electrode material; and
   b) simultaneously sintering all the powder layers by an electric field sintering and thereby obtaining the elementary electrochemical cell.

2. The process of claim 1, in which the electric field is a pulsed electric field.

3. The process of claim 1, in which the first and second electrode materials are chosen from ceramics having an electronic conduction or a mixed electronic/ionic conduction.

4. The process of claim 1, in which the electrolyte material is chosen from ceramics having an exclusively ionic conduction.

5. The process of claim 1, in which the powders of the first and second electrode materials comprise one or more thermally decomposable pore-forming agents.

6. The process of claim 1, in which the elementary electrochemical cell further comprises a first and a second interconnect element, the first and second interconnect elements being in a form of layers and the first electrode, the electrolyte and the second electrode being intercalated between the first and second interconnect elements, and in which a) further comprises intercalating the structure between a first and a second layer of an interconnect material.

7. The process of claim 6, in which the interconnect material is chosen from metal alloys and ceramics.

8. The process of claim 6, in which the first and second layers of the interconnect material are powder layers.

9. The process of claim 1, in which the elementary electrochemical cell has a planar geometry.

10. The process of claim 1, in which the elementary electrochemical cell is a cell of an electrochemical system producing energy or hydrogen.

11. The process of claim 10, in which the energy- or hydrogen-producing electrochemical system is a solid oxide fuel cell or a high temperature electrolyser.

12. A process for manufacturing a stack of elementary electrochemical cells, each cell comprising a first and a second electrode and an electrolyte which is intercalated between the first and second electrodes, the first and second electrodes and the electrolyte being in a form of layers, comprising:
   a) producing a stack of structures in which each structure comprises a layer of a powder of a first electrode material, a layer of a powder of a second electrode material and a layer of a powder of an electrolyte material which is intercalated between the layer of the powder of the first electrode material and the layer of the powder of the second electrode material, and in which the structures are separated from each other by a separating element;
   b) simultaneously sintering all the powder layers by an electric field sintering and thereby obtaining the stack of elementary electrochemical cells.

13. The process of claim 12, in which the electric field is a pulsed electric field.

14. The process of claim 12, in which the first and second electrode materials are chosen from ceramics having an electronic conduction or a mixed electronic/ionic conduction.

15. The process of claim 12, in which the electrolyte material is chosen from ceramics having an exclusively ionic conduction.

16. The process of claim 12, in which the powders of the first and second electrode materials comprise one or more thermally decomposable pore-forming agents.

17. The process of claim 12, in which each elementary electrochemical cell further comprises a first and a second interconnect element, the first and second interconnect elements being in a form of layers and the first electrode, the electrolyte and the second electrode being intercalated between the first and second interconnect elements, and in which a) further comprises intercalating each structure between a first and a second layer of an interconnect material.

18. The process of claim 17, in which the interconnect material is chosen from metal alloys and ceramics.

19. The process of claim 17, in which the first and second layers of the interconnect material are powder layers.

20. The process of claim 12, in which the separating element is a graphite sheet having a first and a second side, the first and second sides of the graphite sheet being coated with a carbon diffusion barrier.

21. The process of claim 12, in which each elementary electrochemical cell has a planar geometry.

22. The process of claim 12, in which each elementary electrochemical cell is a cell of an electrochemical system producing energy or hydrogen.

23. The process of claim 22, in which the energy- or hydrogen-producing electrochemical system is a solid oxide fuel cell or a high temperature electrolyser.

* * * * *